April 27, 1926. 1,582,575
J. G. CASTERAN
TIRE
Filed July 18, 1923
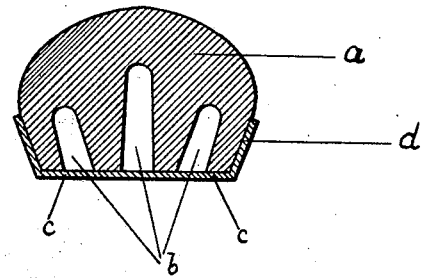
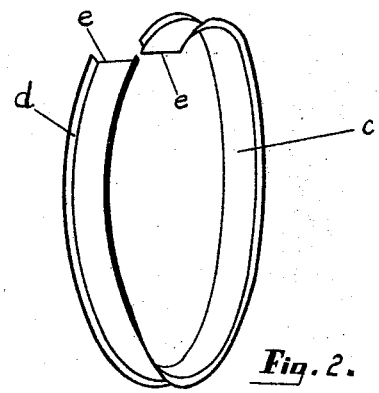
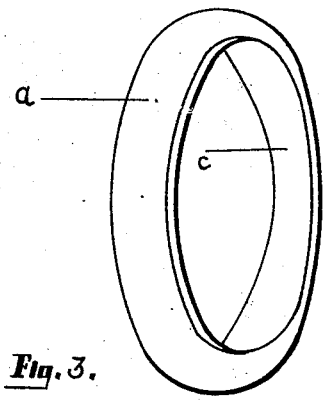
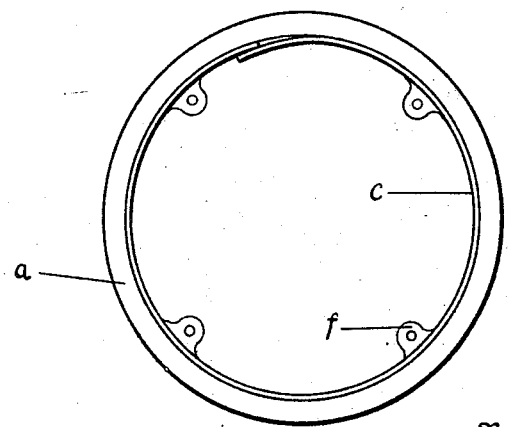
Inventor
Juan Graciano Casteran
By Emil Bömelyche
Attorney Patented Apr. 27, 1926.

1,582,575

UNITED STATES PATENT OFFICE.

JUAN GRACIANO CASTERAN, OF BUENOS AIRES, ARGENTINA.

TIRE.

Application filed July 18, 1923. Serial No. 652,411.

*To all whom it may concern:*

Be it known that I, JUAN GRACIANO CASTERAN, citizen of the Republic of Uruguay, residing at No. 470 Florida Street, Buenos Aires, Argentina, have invented certain new and useful Improvements in Tires, of which the following is a specification.

The present invention has reference to rubber tires for motor driven and other vehicles, and has for its object an improvement in that class of tires in which the air tube is discarded and the desired resiliency obtained by means of a multiplicity of independent cells or pockets provided in the tire.

The tires of the kind specified that have heretofore been proposed have been inefficient, due largely to their excessively complicated construction and correspondingly high cost.

This invention provides a tire of the type referred to, which is very simple, strong and practical.

The accompanying drawing illustrates the manner of carrying the invention into practice.

Fig. 1 is a cross section of a tire and tire rim made in accordance with this invention.

Fig. 2 is a perspective view of the rim.

Fig. 3 is a perspective view of the tire mounted on the rim.

Fig. 4 is a side elevation of the rim and tire.

Referring to said drawing, $a$, is the tire, which is provided with cells or cavities, $b$, and mounted upon rim $c$, having flanged edges $d$.

The rim $c$ is split, as shown, allowing its ends $e$ to overlap, in order to receive the tire. When the tire is placed in position, the rim $c$ is expanded by any suitable mean until the ends abut against each other, and in this manner the tire $a$, is securely held in position. The rim can be secured to the wheel by means of the lugs $f$, in the usual way.

The requisite resiliency is obtained by means of the cells or cavities $b$, which allow the tire $a$ to yield to pressure, but the resiliency is also obtained due to the intimate contact between the tire $a$ and the rim $c$, which causes an airtight closure, as shown in Fig. 1, making a pneumatic chamber of every cell $b$. The greater the pressure upon the tire, the greater the contact between the tire and the rim.

What I claim and desire to protect by Letters Patent is the following:—

The combination of a rubber tire provided with a plurality of radial cells which open through its inner surface, and a spring-metal rim which is split transversely to allow its ends to initially overlap prior to mounting the tire on the rim and to permit it to thereafter be expanded until said ends abut against each other; said rim, when so expanded, exerting a radial outward pressure equally at all points against the inner surface of the tire so as to close the outer ends of said cell in an air-tight manner and permanently trap the air contained therein.

JUAN GRACIANO CASTERAN.